United States Patent
Fujioka (10) Patent No.: US 10,744,637 B2
(45) Date of Patent: Aug. 18, 2020

(54) ROBOT

(71) Applicant: Fanuc Corporation, Yamanashi (JP)

(72) Inventor: Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/274,682

(22) Filed: Feb. 13, 2019

(65) Prior Publication Data
US 2019/0291266 A1 Sep. 26, 2019

(30) Foreign Application Priority Data
Mar. 22, 2018 (JP) .................. 2018-053745

(51) Int. Cl.
*B25J 9/10* (2006.01)
*B25J 9/00* (2006.01)
*B25J 17/00* (2006.01)

(52) U.S. Cl.
CPC ............. *B25J 9/0009* (2013.01); *B25J 9/101* (2013.01); *B25J 17/00* (2013.01)

(58) Field of Classification Search
CPC .......... B25J 9/0009; B25J 9/101; B25J 17/00
See application file for complete search history.

(56) References Cited

U.S. PATENT DOCUMENTS

| | | | | |
|---|---|---|---|---|
| 3,447,692 A | * | 6/1969 | Thomas .................. | B66C 23/94 212/280 |
| 3,664,515 A | * | 5/1972 | Orendorff ............... | B66C 23/94 212/280 |
| 4,828,094 A | * | 5/1989 | Torii .................... | B25J 19/0091 192/139 |
| 2013/0112031 A1 | | 5/2013 | Pan et al. | |
| 2014/0060235 A1 | | 3/2014 | Ootani | |

(Continued)

FOREIGN PATENT DOCUMENTS

| | | | |
|---|---|---|---|
| DE | 20003047 U1 * | 5/2000 | ............ B25J 9/0009 |
| DE | 20003047 U1 * | 6/2000 | |
| EP | 0241556 A1 | 10/1987 | |

(Continued)

OTHER PUBLICATIONS

Matsuura, Yo; Notice of Reasons for Refusal; Japanese Patent Application No. 2018-053745; dated Feb. 25, 2020; 4 pages.

(Continued)

*Primary Examiner* — Randell J Krug
(74) *Attorney, Agent, or Firm* — Ross T. Robinson (57) ABSTRACT

A robot includes a robot main body including a first member, a second member, and a joint that coupling the first and the second members together so as to be relatively rotatable around an axis, a fixed stopper fixed to the first member, and an adaptor and a movable stopper that are each detachably attached to the second member. The second member has a main-body-side attachment part to which either one of the adaptor and the movable stopper is selectively attached. The adaptor has an adaptor-side attachment part to which the movable stopper is attached and which is arranged in a position different from that of the main-body-side attachment part in a circumferential direction around the axis, while the adaptor is in a state of being attached to the main-body-side attachment part.

4 Claims, 7 Drawing Sheets

(56) References Cited

U.S. PATENT DOCUMENTS

2015/0246450 A1* 9/2015 Yoneda .................... B25J 9/101
74/490.05

FOREIGN PATENT DOCUMENTS

| | | |
|---|---|---|
| JP | S59-055685 U | 4/1984 |
| JP | S62-028194 A | 2/1987 |
| JP | H02-232191 A | 9/1990 |
| JP | H10-156786 A | 6/1998 |
| JP | 2014-046447 A | 3/2014 |
| JP | 2015-163414 A | 9/2015 |
| JP | 2017-052032 A | 3/2017 |
| KR | 100749134 B1 * | 8/2007 |
| WO | WO-2017188406 A1 | 11/2017 |
| WO | WO-2018162492 A1 * | 9/2018 |

OTHER PUBLICATIONS

Pasona Group Inc.; Search Report by Registered Search Organization; Japanese Patent Application No. 2018-053745; Feb. 28, 2020; 23 pages.

* cited by examiner

ROBOT

CROSS-REFERENCE TO RELATED APPLICATIONS

This application is based on and claims priority to Japanese Patent Application No. 2018-053745 filed on Mar. 22, 2018, the content of which is incorporated herein by reference in its entirety.

TECHNICAL FIELD

The present invention relates to a robot.

BACKGROUND ART

Conventionally, a stopper that mechanically restricts a motion range (rotation angle range) of a joint of a robot is known (see, for example, PTL 1 through PTL 3). In PTL 2 and PTL 3, a plurality of attachment holes used for attaching the stopper are provided around the joint. By changing the attachment positions of the stopper, it is possible to change the limit angle of the joint defined by the stopper.

CITATION LIST

Patent Literature

{PTL 1}
Japanese Unexamined Patent Application, Publication No. 2014-046447
{PTL 2}
Japanese Unexamined Patent Application, Publication No. Hei 10-156786
{PTL 3}
Japanese Unexamined Patent Application, Publication No. 2015-163414

SUMMARY OF INVENTION

One aspect of the present disclosure provides a robot that includes: a robot main body including a first member, a second member, and a joint provided between the first member and the second member, the joint coupling the first member and the second member together so as to be relatively rotatable around a prescribed axis; a fixed stopper fixed to the first member; an adaptor that is detachably attached to the second member; and a movable stopper that is detachably attached to the second member and to the adaptor, wherein the second member has a main-body-side attachment part to which either one of between the adaptor and the movable stopper is selectively attached, the adaptor has at least one adaptor-side attachment part to which the movable stopper is attached, the aforementioned at least one adaptor-side attachment part is arranged in a position different from that of the main-body-side attachment part in a circumferential direction around the axis, while the adaptor is in a state of being attached to the main-body-side attachment part, and a relative rotation angle range of the first member and the second member relative is restricted as a result of the fixed stopper and the movable stopper abutting against each other around the axis, the movable stopper being attached to either one of the main-body-side attachment part and the adaptor-side attachment part of the adaptor attached to the main-body-side attachment part.

DESCRIPTION OF EMBODIMENT

A robot according to an embodiment of the present invention will be explained below, with reference to the drawings.

Figure 1:
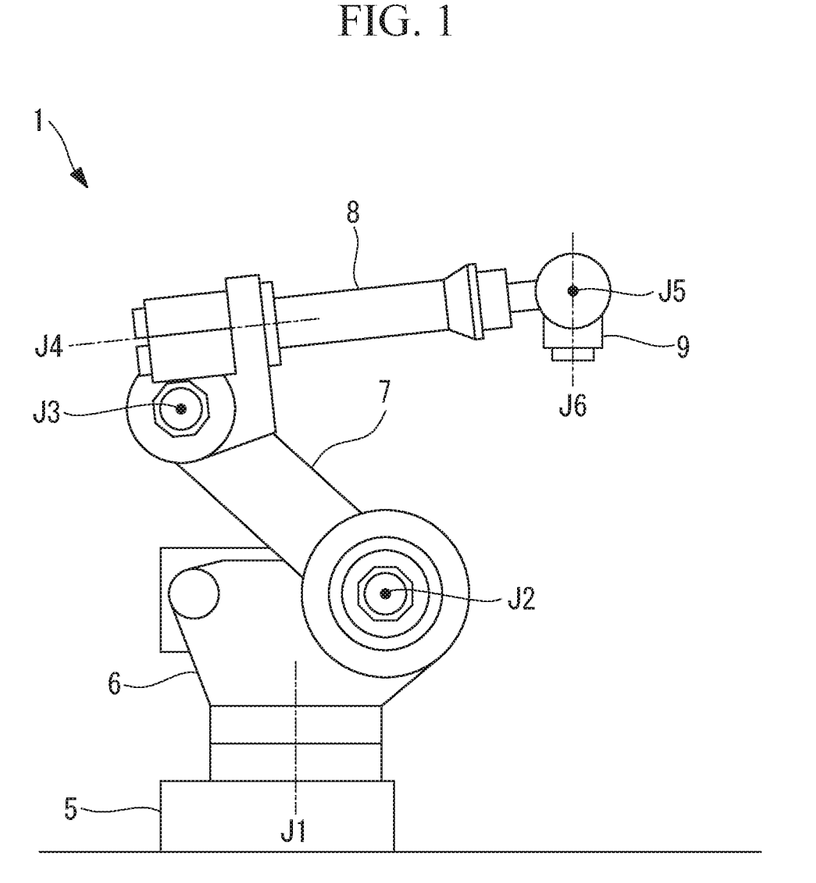
FIG. 1 is a drawing illustrating a robot main body of a robot according to an embodiment of the present invention.
Figure 2:
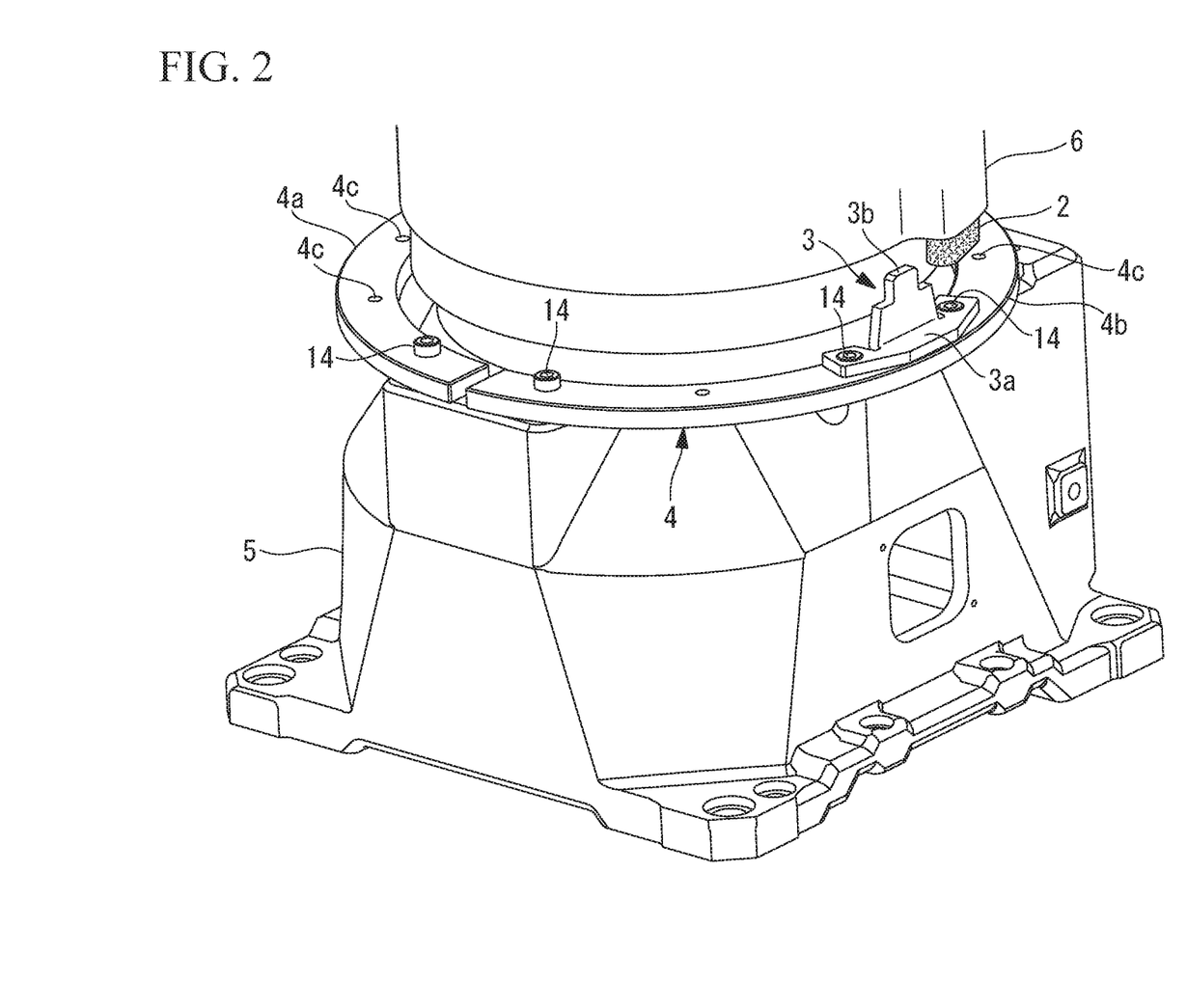
FIG. 2 is a perspective view of surroundings of a first joint of the robot shown in FIG. 1 and illustrates a fixed stopper fixed to a rotating drum, as well as an adaptor and a movable stopper attached to a base.
Figure 3:
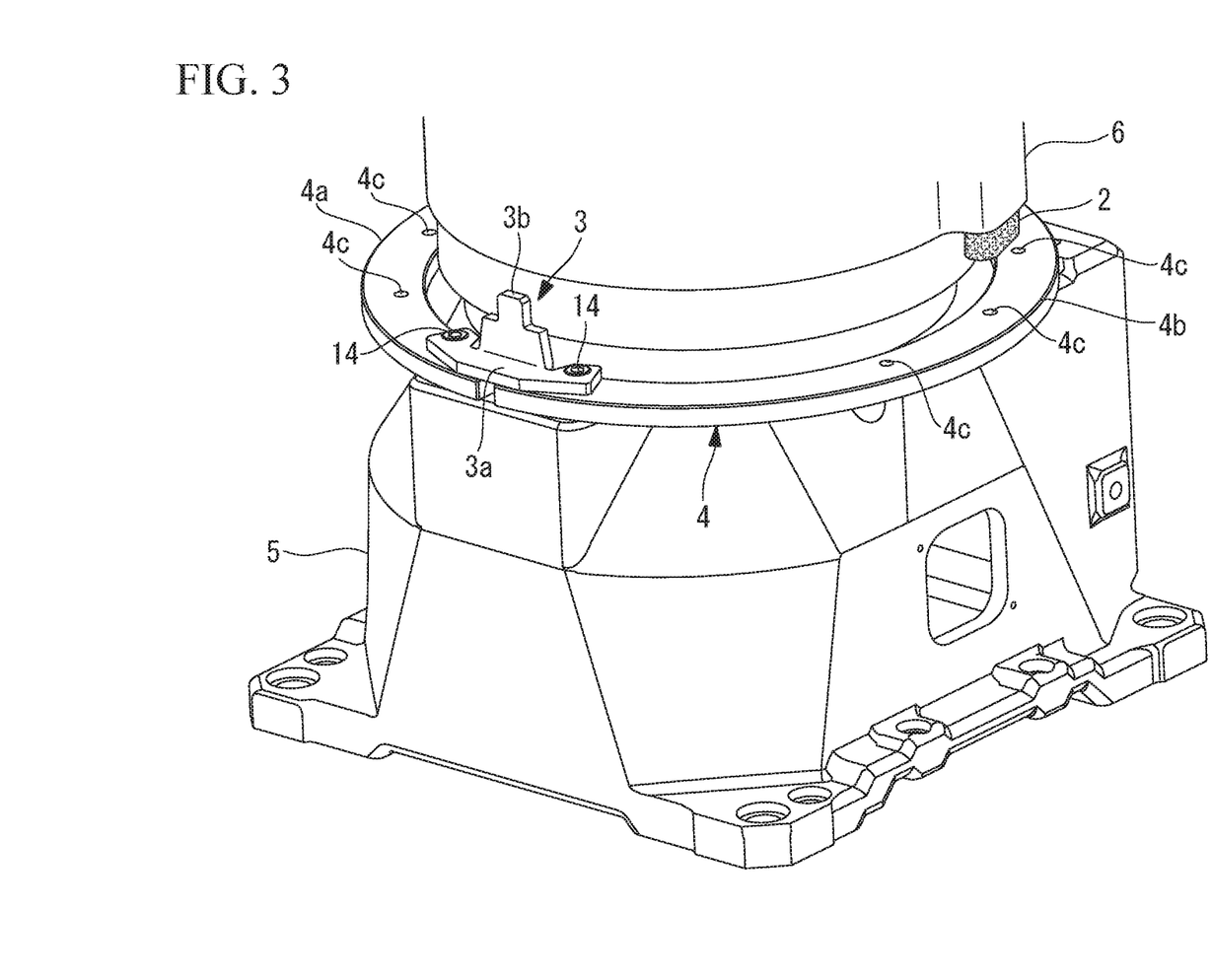
FIG. 3 is a perspective view of surroundings of the first joint of the robot shown in FIG. 1 and illustrates the fixed stopper fixed to the rotating drum, as well as the adaptor and the movable stopper attached to the base.

As illustrated in FIG. 1, FIG. 2, and FIG. 3, the robot according to the present embodiment includes: a 6-axis multi-joint robot main body 1 provided with six joints having joint axes (axes) J1, J2, J3, J4, J5, and J6, respectively; a pair of stoppers 2 and 3 that are provided around a first joint and that mechanically restrict the motion range of the first joint; and an adaptor 4 used for changing a limit angle of the motion range of the first joint.

FIG. 2 and FIG. 3 each illustrate surroundings of the first joint of the robot main body 1 to which the adaptor 4 is attached.

The robot main body 1 includes: a base 5 fixed to a floor; a rotating drum 6 disposed over the base 5 and coupled to the base 5 via the first joint; a first arm 7 coupled to the rotating drum 6 via a second joint; a second arm 8 coupled to a tip end of the first arm 7 via a third joint and a fourth joint; and a tip end part 9 coupled to a tip end of the second arm 8 via a fifth joint and a sixth joint. It is possible to attach an end effector such as a hand to the tip end part 9.

The first joint has a servo motor (not shown in the drawings), so that the servo motor causes the rotating drum 6 to turn (rotate) around the first axis J1 extending in the vertical direction, with respect to the base 5.

The second joint has a servo motor (not shown in the drawings), so that the servo motor causes the first arm 7 to turn (swing) around the second axis J2 extending horizontally, with respect to the rotating drum 6.

The third joint has a servo motor (not shown in the drawings), so that the servo motor causes the second arm 8 to turn (swing) around the third axis J3 extending parallel to the second axis J2, with respect to the first arm 7.

The fourth joint has a servo motor (not shown in the drawings), so that the servo motor causes the second arm 8 to turn around the fourth axis J4 being the longitudinal axis of the second arm 8, with respect to the first arm 7.

The fifth joint has a servo motor (not shown in the drawings), so that the servo motor causes the tip end part 9 to turn (swing) around the fifth axis J5 extending orthogonal to the longitudinal axis of the second arm 8, with respect to the second arm 8.

The sixth joint includes a servo motor (not shown in the drawings), so that the servo motor causes the tip end part 9 to turn around the sixth axis J6 extending orthogonal to the fifth axis J5, with respect to the second arm 8.

Figure 4:
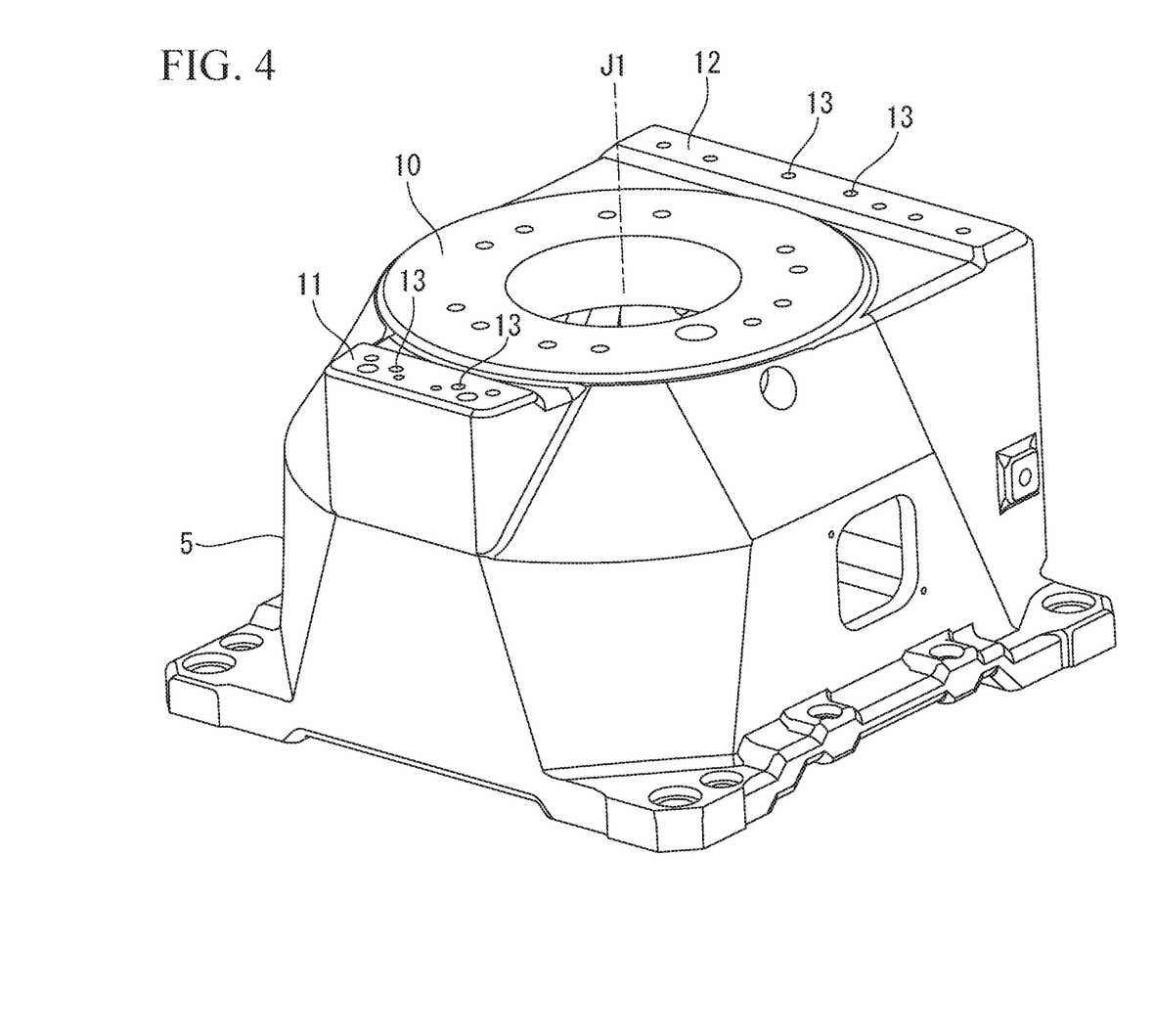
FIG. 4 is a perspective view taken from diagonally above the base of the robot main body shown in FIG. 1.

As illustrated in FIG. 4, provided on the top face of the base 5 are a mounting face 10 which is flat, has a circular shape, and on which the rotating drum 6 can be mounted; and attachment faces 11 and 12 that are flat and are positioned on the outside, in terms of the radial direction, of the mounting face 10. The first axis J1 extends through the center of the mounting face 10.

The attachment faces 11 and 12 are provided on the front side and the rear side of the base 5, respectively. The attachment face 11 positioned on the front side is provided with a pair of tap holes (a main-body-side attachment part) 13 to which either one of a movable stopper 3 and an adaptor 4 can be selectively attached. The attachment face 12 positioned on the rear side is provided with a pair of tap holes 13 to which it is possible to attach the adaptor 4. Further, also to the pair of tap holes 13 formed in the attachment face 12, either one of the adaptor 4 and the movable stopper 3 can be selectively attached.

Each of the attachment faces 11 and 12 may also be provided with, in addition to the tap holes 13, a hole used for fixing any member thereto other than the movable stopper 3 and the adaptor 4.

As illustrated in FIG. 2 and FIG. 3, one of the stoppers, i.e., the stopper 2, is a fixed stopper that is fixed to an outer circumferential part in a lower end part of the rotating drum (the first member) 6 and that protrudes downward. The fixed stopper 2 is fixed onto the rear side of the rotating drum 6. FIG. 2 and FIG. 3 each illustrate a state in which the rotating drum 6 has turned approximately 90° with respect to the base 5.

The other stopper, i.e., the stopper 3, is a movable stopper that is detachably attachable to the pair of tap holes 13 formed in the attachment face 11 provided on the front side of the base (the second member) 5 and to a pair of tap holes 4c (explained later) formed in the adaptor 4.

The movable stopper 3 is formed of highly-rigid metal, for example. The fixed stopper 2 is formed of an elastic material such as rubber or metallic materials such as bolts, for example. The materials of the stoppers 2 and 3 may be changed as appropriate. The stoppers 2 and 3 may each be formed of a combination of two or more materials.

Figure 5:
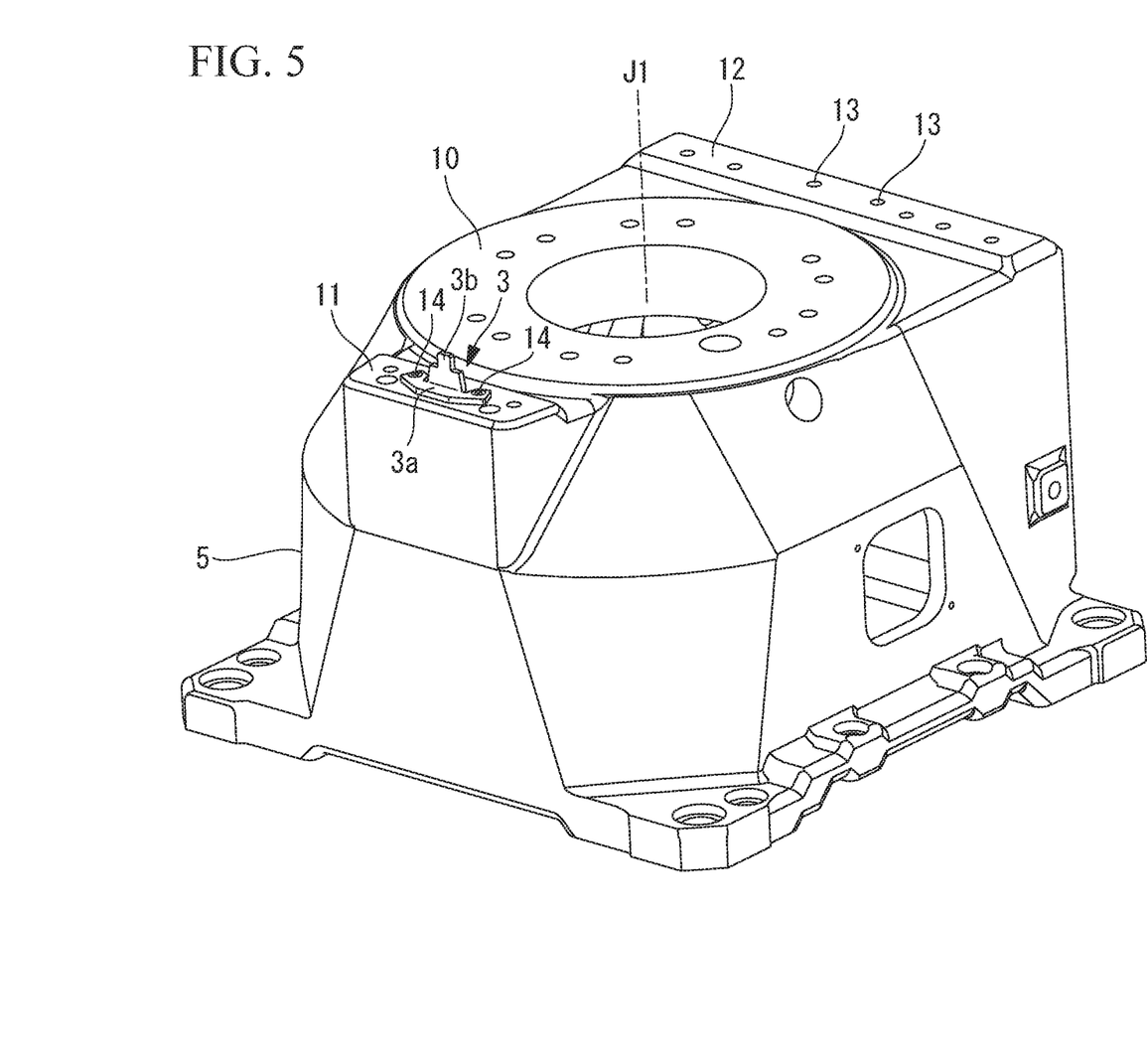
FIG. 5 is a drawing illustrating a manner in which the movable stopper is attached to an attachment face of the base shown in FIG. 4.
Figure 6A:
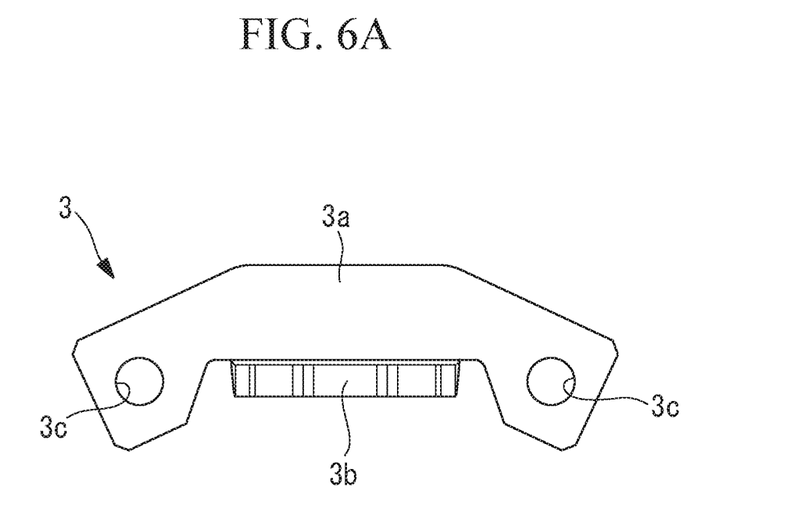
FIG. 6A is a plan view of the movable stopper shown in FIG. 2 and FIG. 3.
Figure 6B:
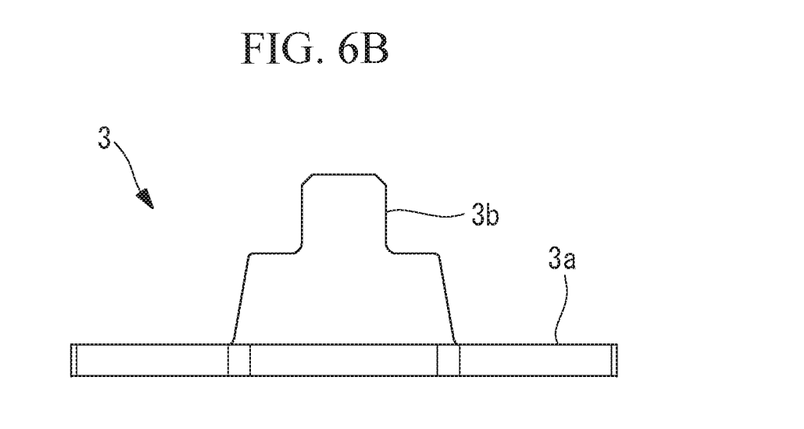
FIG. 6B is a front view of the movable stopper shown in FIG. 2 and FIG. 3.

As shown in FIG. 6A and FIG. 6B, the movable stopper 3 has a fixing part 3a that is flat and a protruding part 3b that protrudes from the top face of the fixing part 3a in a direction perpendicular to the top face. The fixing part 3a is provided with a pair of through holes 3c that penetrates the fixing part 3a and corresponds to the pair of tap holes 13. As shown in FIG. 5, it is possible to directly fix the movable stopper 3 onto the attachment face 11, by positioning the movable stopper 3 on the attachment face 11 in such a manner that the bottom face of the fixing part 3a is in contact with the attachment face 11, inserting bolts 14 into the pair of tap holes 13 via the through holes 3c, and fastening the bolts 14 in the tap holes 13.

The movable stopper 3 fixed to the attachment face 11 restricts the motion range (the rotation angle range) of the first joint to be within a prescribed angle range (e.g., ±170°). For example, as a result of the fixed stopper 2 abutting, in a circumferential direction, against the protruding part 3b of the movable stopper 3 when the rotating drum 6 has rotated +170° or −170° with respect to the base 5, the rotation of the rotating drum 6 beyond that range is mechanically restricted.

Figure 7:
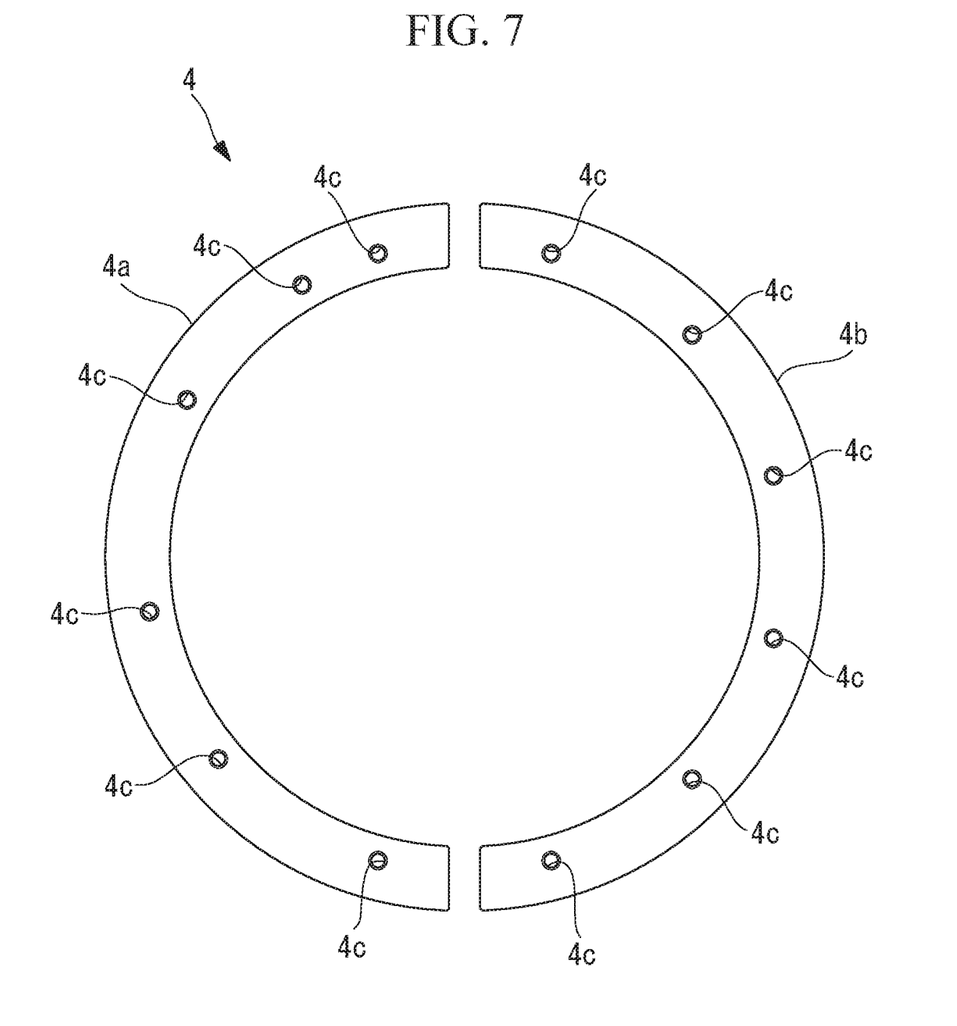
FIG. 7 is a plan view of the adaptor shown in FIG. 2 and FIG. 3.

As shown in FIG. 7, the adaptor 4 includes a pair of members 4a and 4b each of which is flat and is in the shape of a semi-circular arc. Each of the members 4a and 4b has formed therein a plurality of tap holes 4c arranged at intervals in an array in the circumferential direction. The tap holes 4c are provided in a plurality of positions including the two end parts of each of the members 4a and 4b and positions between the two end parts.

The interval between the pair of tap holes 4c positioned adjacent to each other in the circumferential direction is equal to the interval between the pair of tap holes 13 formed in the attachment face 11. Further, it is possible to fasten a same bolt 14 into the tap hole 13 and the tap hole 4c. Accordingly, in the same manner as the movable stopper 3 is fixed to the attachment face 11, it is possible to fix the movable stopper 3 to the members 4a and 4b by inserting the bolts 14 into each of the pair of tap holes 4c (the adaptor-side attachment part) positioned adjacent to each other via the through holes 3c formed in the movable stopper 3 and fastening the bolts 14 into the tap holes 4c.

As shown in FIG. 2 and FIG. 3, one of the members, i.e., the member 4a, is arranged around the mounting face 10 in such a manner that the two end parts thereof are positioned on the attachment faces 11 and 12 and is fixed onto the attachment faces 11 and 12 as a result of the bolts 14 being fastened into the tap holes 4c formed in the two end parts and in the tap holes 13 formed in the attachment faces 11 and 12. Similarly, the other member, i.e., the member 4b, is fixed onto the attachment faces 11 and 12 by the bolts 14. As a result, the members 4a and 4b are arranged around the mounting face 10 along the circumferential direction around the first axis J1, so that the adaptor 4, which has an annular shape, is attached around the mounting face 10 along substantially the entire circumference thereof. In this state, the tap holes 4c are arranged in an array along the entire circumference around the mounting face 10.

It is possible to change the length of each of the members 4a and 4b in the circumferential direction as appropriate. For example, each of the members 4a and 4b may be in the shape of an arc that is shorter than a semi-circular arc, so that it is possible to attach the adaptor 4 in certain sections around the mounting face 10.

Next, an operation of the robot structured as described above will be explained.

The motion range of each of the joints of the robot main body 1 is restricted by a robot controller (not shown in the drawings) by using a control program that controls the robot main body 1. In a standard state of the robot, the control program is set with the motion range of the first joint so as to be either the prescribed angle range or a range smaller than the prescribed angle range, while the movable stopper 3 is attached, as shown in FIG. 5, to the pair of tap holes 13 formed in the attachment face 11 provided on the front side, which is a standard position.

In the standard state described above, when the rotating drum 6 has rotated up to the limit angle, the fixed stopper 2 abuts against the movable stopper 3, so that the rotating drum 6 is inhibited by the movable stopper 3 from rotating beyond that range. Accordingly, even when the restriction imposed on the motion range of the first joint by the robot controller does not function properly for some reason, it is possible to prevent the rotating drum 6 from rotating beyond the limit angle, by mechanically restricting the motion range of the first joint by the stoppers 2 and 3.

When the user wishes to change the limit angle of the motion range of the first joint from ±170° to another angle, the user can change the attachment position of the movable stopper 3 by using the adaptor 4, along the circumferential direction around the first axis J1.

First, the movable stopper 3 is removed from the attachment face 11 by pulling the bolts 14 out of the pair of tap holes 13. Further, as shown in FIG. 2 and FIG. 3, the adaptor 4 is attached, by using the bolts 14, to the pair of tap holes 13 formed in the attachment face 11 and to the pair of tap holes 13 formed in the attachment face 12.

Subsequently, a pair of tap holes 4c is selected from among the plurality of tap holes 4c formed in the adaptor 4, so as to attach the movable stopper 3 to the selected pair of tap holes 4c by the bolts 14. As a result, it is possible to change the limit angle of the motion range of the first joint by the movable stopper 3 to a desired angle. The number of the movable stoppers 3 attached to the adaptor 4 may be only one; however, it is also acceptable to attach two movable stoppers 3 to two locations of the adaptor 4, as necessary. As shown in FIG. 2, when the movable stopper 3 is attached to a pair of tap holes 4c formed in the attachment face 11 or 12, the movable stopper 3 and the adaptor 4 are fastened together by the bolts 14.

If an attachment face extending along the entire circumference around the mounting face 10 were provided, and a large number of tap holes were formed in the attachment face, the cost of the robot main body 1 would increase because it would be necessary to perform as many tapping processes as the number of tap holes. Further, when the base 5 has a slim and simple design, there might not be any space around the mounting face 10, and it might be impossible, in some situations, to reserve a region serving as an attachment face around the mounting face 10. Or if an attachment face surrounded the mounting face 10 along the entire circumference, the design in the surroundings of the first joint might be restricted, and it might be difficult in some situations to realize a design required of the base 5.

In contrast, according to the present embodiment, it is possible to attach the movable stopper 3 and the adaptor 4 to the pair of common tap holes 13 formed in the attachment face 11. Further, by attaching the adaptor 4 to the pair of tap holes 13 formed in the attachment face 11 and to the pair of tap holes 13 formed in the attachment face 12, the tap holes 4c used for attaching the movable stopper 3 are added to the positions that are different from the standard positions. Accordingly, it is sufficient to provide the robot main body 1 with only the two pairs of tap holes 13. Also, the small areas provided only on the front and rear sides of the mounting face 10 are sufficient to serve as the attachment faces 11 and 12 in which the two pairs of tap holes 13 are formed.

In other words, even when the base 5 has a slim and simple design, it is possible to provide the attachment faces 11 and 12 in the limited space around the mounting face 10, without affecting the design of the base 5. Also, it is possible to prevent the attachment faces 11 and 12 from restricting the design of the base 5. As explained herein, an advantageous effect is exerted where it is possible to achieve both, at the same time, a high degree of freedom for the design in the surroundings of the first joint of the robot main body 1 and the ability to provide the plurality of attachment positions for the movable stopper 3.

Further, the machining process required by forming the tap holes 4c in the adaptor 4 is easier than the machining process required by forming the tap holes 13 in the robot main body 1. Accordingly, another advantageous effect is achieved where it is possible to lower the cost of the robot main body 1, by minimizing the number of tap holes 13 formed in the robot main body 1.

Further, it is possible to easily change the number and the positions of the tap holes 4c formed in the adaptor 4. It is therefore possible to manufacture, at a low cost, a variety of adaptors 4 having different numbers and positions of the tap holes 4c. In other words, it is possible to manufacture the adaptor 4 so as to add an attachment position of the movable stopper 3 in an arbitrary position according to a demand of the user. Accordingly, by manufacturing a custom-made adaptor 4 according to a demand of each user while using the same robot main body 1 for all the users, an advantageous effect is achieved in that it is possible to realize various limit angles requested by various users, easily and at low costs.

As we compare the situation where the movable stopper 3 is directly fixed to the attachment face 11 with the situation where the movable stopper 3 is fixed to the adaptor 4, the height of the movable stopper 3 is different by as much as the thickness of the adaptor 4.

To solve the difference in the height of the movable stopper 3, it is also acceptable to interpose a spacer having the same thickness as that of the adaptor 4 between the movable stopper 3 and the attachment face 11, when the movable stopper 3 is fixed onto the attachment face 11. Alternatively, it is also acceptable to prepare two types of movable stoppers 3 having different heights so as to selectively use one of the two types of movable stoppers 3 when the movable stopper 3 is directly fixed onto the attachment face 11 and when the movable stopper 3 is fixed onto the adaptor 4.

In the present embodiment, the example is explained in which the adaptor 4 surrounds the mounting face 10 along substantially the entire circumference thereof, while the tap holes 4c are provided around the mounting face 10 along the entire circumference thereof. Alternatively, another arrangement is also acceptable in which the adaptor 4 is provided only in one section of the area around the mounting face 10 while the tap holes 4c are provided in only one section of the area around the mounting face 10.

For example, the adaptor 4 may be structured with only one of the members (either 4a or 4b) that are in the shape of a semi-circular arc. In another example, the members 4a and 4b each may have a shape other than an arc.

In the present embodiment, the example is explained in which the attachment faces 11 and 12 are provided both on the front side and on the rear side of the base 5; however, the positions and the number of the attachment faces may be modified according to the shape of the adaptor 4 or the like.

For example, the attachment faces 11 and 12 may be provided in positions other than the front side and the rear side of the base 5. Alternatively, the adaptor 4 may be attached only to the pair of tap holes 13 formed in the attachment face 11 positioned on the front side, while the attachment face 12 on the rear side is not provided.

In the present embodiment, the example is explained in which the fixed stopper 2 is fixed to the rotating drum 6, while the movable stopper 3 and the adaptor 4 are each detachably attached to the base 5. Alternatively, another arrangement is also acceptable in which the fixed stopper 2 is fixed to the base (the first member) 5, while the movable stopper 3 and the adaptor 4 are each detachably attached to the rotating drum (the second member) 6.

In the present embodiment, the example is explained in which the movable stopper 3 is fixed at the two points to the attachment face 11 and to the adaptor 4, by using the bolts 14. Alternatively, it is also acceptable to fix the movable stopper 3 only at one point or at three or more points.

In the present embodiment, the example is explained in which the stoppers 2 and 3 are provided around the first joint so as to restrict the motion range of the first joint. However, the stoppers 2 and 3 may be provided around any other joint to restrict the motion range of the other joint, instead of the first joint or in addition to the first joint.

In the present embodiment, the example is explained in which the robot main body 1 is a 6-axis multi-joint industrial robot; however, the robot main body 1 may be an arbitrary type of robot having a joint, such as a scalar robot or a parallel link robot, for example.

From the above-described embodiments, the following aspect of the present disclosure is derived.

One aspect of the present invention provides a robot that includes: a robot main body including a first member, a second member, and a joint provided between the first member and the second member, the joint coupling the first member and the second member together so as to be relatively rotatable around a prescribed axis; a fixed stopper fixed to the first member; an adaptor that is detachably attached to the second member; and a movable stopper that is detachably attached to the second member and to the adaptor, wherein the second member has a main-body-side attachment part to which either one of between the adaptor and the movable stopper is selectively attached, the adaptor has at least one adaptor-side attachment part to which the movable stopper is attached, the aforementioned at least one adaptor-side attachment part is arranged in a position different from that of the main-body-side attachment part in a circumferential direction around the axis, while the adaptor is in a state of being attached to the main-body-side attachment part, and a relative rotation angle range of the first member and the second member relative is restricted as a result of the fixed stopper and the movable stopper abutting against each other around the axis, the movable stopper being attached to either one of the main-body-side attachment part and the adaptor-side attachment part of the adaptor attached to the main-body-side attachment part.

According to this aspect, when the first member and the second member relatively rotate due to the motion of the joint, the rotating angle, which is defined by the fixed stopper fixed to the first member and the movable stopper attached to the main-body-side attachment part of the second member abutting against each other, inhibits the first member and the second member from relatively rotating beyond the rotating angle. With these arrangements, it is possible to mechanically restrict the motion range of the joint.

In that situation, by using the adaptor, it is possible to change the position of the movable stopper in a circumferential direction around the axis. Accordingly, it is possible to change the limit angle of the motion range of the joint defined by the fixed stopper and the movable stopper. In other words, by attaching the adaptor in place of the movable stopper to the main-body-side attachment part and attaching the movable stopper to an arbitrary adaptor-side attachment part of the adaptor, it is possible to change the position of the movable stopper to a position different from that of the main-body-side attachment part.

As explained above, either one of the movable stopper and the adaptor can be selectively attached to the main-body-side attachment part used in common thereto. Accordingly, by attaching the adaptor to the main-body-side attachment part, it is possible to add an attachment position of the movable stopper in another position different from that of the main-body-side attachment part. Consequently, in the surroundings of the joint, it is sufficient to provide the second member with only one main-body-side attachment part. It is therefore possible to change the limit angle of the joint even when the space provided in the surroundings of the joint is limited.

Further, the machining process required in providing the adaptor with the adaptor-side attachment part is easier than the machining process required in providing the robot main body with the main-body-side attachment part. Accordingly, it is possible to lower the cost of the robot main body, by minimizing the number of main-body-side attachment parts. Further, it is possible to manufacture, easily and at a low cost, a variety of adaptors having different numbers and different positions of adaptor-side attachment parts. Consequently, it is possible to realize various limit angles requested by users at a low cost.

In the aspect described above, another arrangement is also acceptable in which the adaptor in a shape of an arc arranged along a circumferential direction around the axis, and two or more of the adaptor-side attachment parts are arranged in a circumferential direction of the adaptor.

With this arrangement, while using the single adaptor, it is possible to change the limit angle of the motion range of the joint to a plurality of angles.

In the aspect described above, another arrangement is also acceptable in which one of the first and the second members is a base fixed to a floor, another of the first and the second members is a rotating drum disposed over the base, and the joint couples the base and the rotating drum in such a manner that the rotating drum rotates around a vertical axis with respect to the base.

With this arrangement, by using the fixed stopper and the movable stopper, it is possible to restrict the range of the rotating angle of the rotating drum with respect to the base.

According to the aforementioned aspect related to the robot provided with the stopper that restricts the motion range of the joint, an advantageous effect is achieved in that it is possible to change the limit angle of the motion range of the joint, even when the space provided in the surroundings of the joint is limited.

REFERENCE SIGNS LIST 1 robot main body
2 fixed stopper
3 movable stopper
3a fixing part
3b protruding part
3c through hole
4 adaptor
4a, 4b member
4c tap hole (adaptor-side attachment part)
5 base (second member)
6 rotating drum (first member)
7 first arm (member)
8 second arm (member)
9 tip end part (member)
10 mounting face
11, 12 attachment face
13 tap hole (main-body-side attachment part)
14 bolt
J1, J2, J3, J4, J5, J6 joint axis (axis)

The invention claimed is:

1. A robot comprising:
a robot main body including a first member, a second member, and a joint provided between the first member and the second member, the joint coupling the first member and the second member together so as to be relatively rotatable around a prescribed axis;
a fixed stopper fixed to the first member;
an adaptor that is capable of being detachably attached to the second member; and a movable stopper that is capable of being detachably attached to the adaptor when the adaptor is attached to the second member, and capable of being detachably attached to the second member without the adaptor when the adaptor is not attached to the second member, wherein the second member has a main-body-side attachment part to which either one of the adaptor and the movable stopper is selectively attached, the adaptor has at least one adaptor-side attachment part to which the movable stopper is attached, said at least one adaptor-side attachment part is arranged in a position different from that of the main-body-side attachment part in a circumferential direction around the axis, while the adaptor is in a state of being attached to the main-body-side attachment part, and a relative rotation angle range of the first member and the second member is restricted as a result of the fixed stopper and the movable stopper abutting against each other around the axis, the movable stopper being attached to either one of the main-body-side attachment part and the adaptor-side attachment part of the adaptor attached to the main-body-side attachment part.

2. The robot according to claim 1, wherein
the adaptor is in a shape of an arc arranged along a circumferential direction around the axis, and
two or more of the adaptor-side attachment parts are arranged in a circumferential direction of the adaptor.

3. The robot according to claim 1, wherein
one of the first and the second members is a base fixed to a floor,
another of the first and the second members is a rotating drum disposed over the base, and
the joint couples the base and the rotating drum in such a manner that the rotating drum rotates around a vertical axis with respect to the base.

4. The robot according to claim 1, wherein:
the fixed stopper has a protruding portion protruding downward;
the movable stopper comprises a protruding portion protruding upward from a top surface of the movable stopper; and
the protruding portion of the movable stopper abuts against the protruding portion of the fixed stopper to restrict the relative rotation angle range of the first member and the second member.

* * * * *